(12) United States Patent
Stefanov et al.

(10) Patent No.: US 9,304,572 B2
(45) Date of Patent: Apr. 5, 2016

(54) SYSTEM AND METHOD FOR MANAGING A POWER MODE OF A DESIGNATED ELECTRONIC DEVICE

(71) Applicant: Google Inc., Mountain View, CA (US)

(72) Inventors: Hristo Stefanov Stefanov, Mountain View, CA (US); Trond Thomas Wuellner, Mountain View, CA (US); Alexander Friedrich Kuscher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 366 days.

(21) Appl. No.: 13/631,703

(22) Filed: Sep. 28, 2012

(65) Prior Publication Data
US 2014/0095901 A1 Apr. 3, 2014

(51) Int. Cl.
*G06F 1/32* (2006.01)
*H04W 8/22* (2009.01)

(52) U.S. Cl.
CPC ............ *G06F 1/3231* (2013.01); *G06F 1/3206* (2013.01); *G06F 1/32* (2013.01); *H04W 8/22* (2013.01); *Y02B 60/1289* (2013.01)

(58) Field of Classification Search
CPC .......... H04W 8/22; G06F 1/32; G06F 1/3231; G06F 1/3206; Y02B 60/1289
USPC ....................................... 713/320; 455/456.1
See application file for complete search history.

(56) References Cited

U.S. PATENT DOCUMENTS

| | | | |
|---|---|---|---|
| 7,685,606 B2 | 3/2010 | Chang | |
| 8,095,814 B2 * | 1/2012 | O'Connell et al. | 713/323 |
| 2001/0027530 A1 * | 10/2001 | Yen et al. | 713/300 |
| 2007/0143499 A1 | 6/2007 | Chang | |
| 2008/0089254 A1 * | 4/2008 | Graves et al. | 370/310 |
| 2008/0143604 A1 | 6/2008 | Mock et al. | |
| 2008/0229091 A1 | 9/2008 | Abu-Akel | |
| 2008/0270814 A1 * | 10/2008 | Starr et al. | 713/323 |
| 2009/0305742 A1 | 12/2009 | Caballero et al. | |
| 2011/0004778 A1 | 1/2011 | Tsukamoto et al. | |
| 2011/0126034 A1 | 5/2011 | Siegel et al. | |
| 2011/0250875 A1 * | 10/2011 | Huang et al. | 455/418 |
| 2011/0250901 A1 * | 10/2011 | Grainger et al. | 455/456.1 |
| 2012/0003933 A1 | 1/2012 | Baker et al. | |
| 2012/0237908 A1 | 9/2012 | Fitzgerald et al. | |
| 2014/0052974 A1 * | 2/2014 | Masters | 713/1 |

FOREIGN PATENT DOCUMENTS

EP 2053573 4/2009

\* cited by examiner

*Primary Examiner* — Jaweed A Abbaszadeh
*Assistant Examiner* — Terrell Johnson
(74) *Attorney, Agent, or Firm* — McDermott Will & Emery LLP (57) ABSTRACT

A system and method for managing a power mode of a designated electronic device are provided. A geographical location of a mobile electronic device is determined. A comparison of the determined geographical location of the mobile electronic device and a stored location of a designated electronic device in a power-off mode is made. A wake-up signal is sent to the designated electronic device if the determined geographical location of the mobile electronic device is within a proximity threshold of the designated electronic device, where the designated electronic device is configured to enter a power-on mode upon receipt of the wake-up signal.

18 Claims, 4 Drawing Sheets

SYSTEM AND METHOD FOR MANAGING A POWER MODE OF A DESIGNATED ELECTRONIC DEVICE

BACKGROUND

The subject technology generally relates to managing a power mode of an electronic device, and in particular, relates to managing a power mode of an electronic device based on a proximity to a mobile electronic device.

An electronic device in an off-power mode can take a long time to power up. Time cost associated with powering up the electronic device results in a loss of work productivity. However, maintaining the electronic device in an on-power mode is not energy efficient.

SUMMARY

According to one aspect of the subject technology, a computer-implemented method for managing a power mode of a designated electronic device is provided. The method comprises determining a geographical location of a mobile electronic device. The method further comprises comparing the determined geographical location of the mobile electronic device with a stored location of a designated electronic device in a power-off mode. The method further comprises sending a wake-up signal to the designated electronic device if the determined geographical location of the mobile electronic device is within a proximity threshold of the designated electronic device, wherein the designated electronic device is configured to enter a power-on mode upon receipt of the wake-up signal.

According to another aspect of the subject technology, a system for managing a power mode of a designated electronic device is provided. The system comprises one or more processors, and a machine-readable medium comprising instructions stored therein, which when executed by the processors, cause the processors to perform operations comprising determining a geographical location of a mobile electronic device, wherein the geographical location of the mobile electronic device is obtained from signals transmitted from a satellite navigation system component of the mobile electronic device. The operations further comprise comparing the determined geographical location of the mobile electronic device with a stored location of a designated electronic device in a power-off mode. The operations further comprise sending a wake-up signal to the designated electronic device if the determined geographical location of the mobile electronic device is within a proximity threshold of the designated electronic device, wherein the designated electronic device is configured to enter a power-on mode upon receipt of the wake-up signal.

According to another aspect of the subject technology, a machine readable medium for managing a power mode of a designated electronic device is provided. The machine readable medium comprising instructions stored therein, which when executed by a system, cause the system to perform operations comprising determining a geographical location of a smartphone device, wherein the geographical location of the mobile electronic device is obtained from signals transmitted from a satellite navigation system component of the mobile electronic device. The operations further comprise comparing the determined geographical location of the smartphone device with a stored location of a desktop computer in a power-off mode. The operations further comprise sending a wake-up signal to the desktop computer if the determined geographical location of the smartphone device is within a proximity threshold of the desktop computer, wherein the desktop computer is configured to enter a power-on mode upon receipt of the wake-up signal.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology. In the drawings.

DETAILED DESCRIPTION

The detailed description set forth below is intended as a description of various configurations of the subject technology and is not intended to represent the only configurations in which the subject technology may be practiced. It will be apparent, however, that the subject technology is not limited to the specific details set forth herein and may be practiced without these specific details. In some instances, structures and components are shown in block diagram form in order to avoid obscuring the concepts of the subject technology.

In accordance with the subject disclosure, a system and a method for managing a power mode of a designated electronic device are provided. A designated electronic device may include any electronic device that includes a hardware component (e.g., a network card) that can receive a signal indicating a request to turn on the designated electronic device while the electronic device is in off-power mode. The mobile electronic device and the designated electronic device may be set up to recognize each other during an initial setup phase. The geographical location of the designated electronic device is provided to the mobile electronic device. The mobile electronic device periodically determines its geographical location and compares its determined geographical location with the stored location of the designated electronic device to determine the proximity of the mobile device with respect to the designated electronic device. The mobile electronic device sends a wake-up signal to the designated electronic device if the determined geographical location of the mobile electronic device is within a proximity threshold of the designated electronic device. A communication protocol (e.g., WiFi, Bluetooth, etc.) that is supported by both the mobile electronic device and the designated electronic device may be used to transmit the wake-up signal.

According to one example, the mobile electronic device may continue to periodically determine its geographical location and compares its determined geographical location with the stored location of the designated electronic device even after it stops sending the wake-up signal to the designated electronic device. However, the mobile electronic device resets as soon as it leaves the proximity range, and will resend the wake-up signal to the designated electronic device when the mobile electronic device reenters the proximity range.

Figure 1:
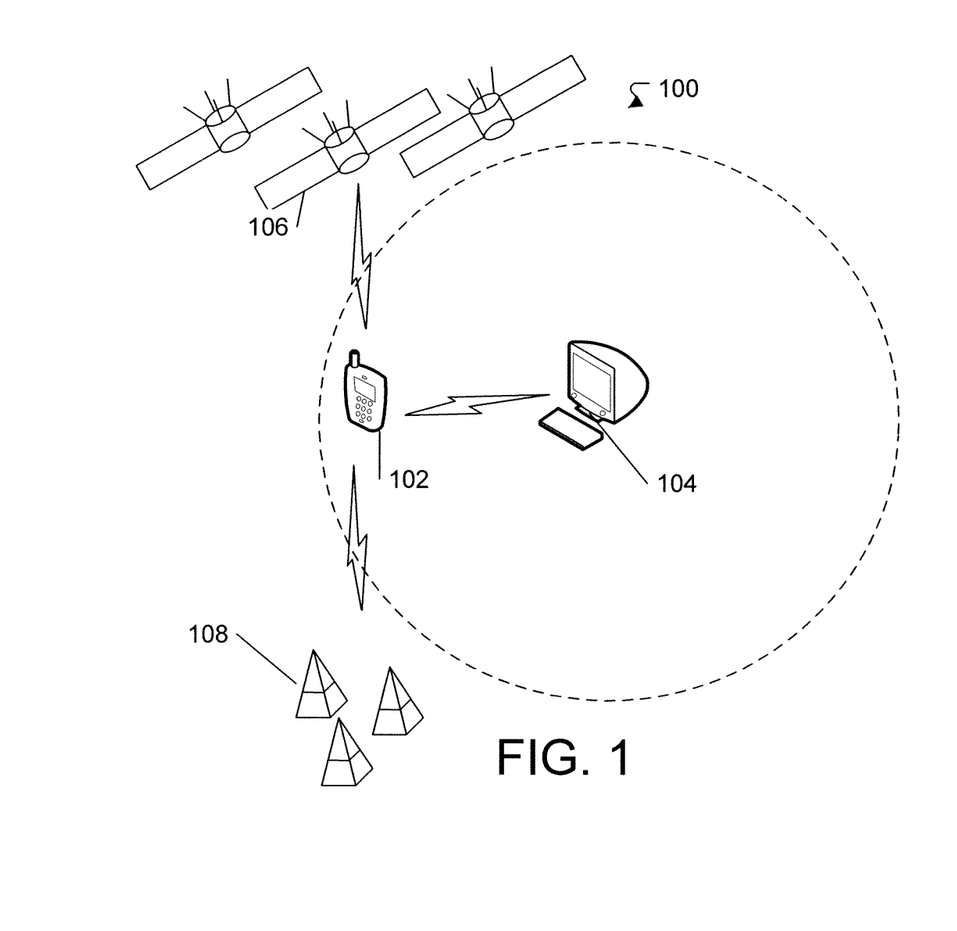
FIG. 1 illustrates an example distributed network environment for managing a power mode of a designated electronic device.

FIG. 1 illustrates an example network environment for managing a power mode of a designated electronic device. Network environment 100 includes electronic devices 102 and 104, and geolocation systems 106 and 108. Geolocation systems include a system or group of systems that broadcast signals that allow mobile electronic device 102 to determine its geographical location. In the example of FIG. 1, geolocation system 106 is depicted as a satellite navigation system, and geolocation system 108 is depicted as base stations.

Mobile electronic device 102 may include any electronic device with hardware and software components to determine its geographical location. In the example of FIG. 1, mobile electronic device 102 is depicted as a smartphone device. Additional examples of mobile electronic device includes tablet computers, laptop computers, PDAs, etc. Designated electronic device 104 may include any electronic device that includes a hardware component (e.g., a network card) that can receive a signal while the electronic device is in off-power mode. For example, the designated electronic device may contain a network card that remains enabled to receive signals while the designated electronic device is in off-power mode. Designated electronic device 104 is also configured to enter a power-on mode upon receipt of a wake-up signal. In the example of FIG. 1, designated electronic device 104 is depicted as a desktop computer. Additional examples of designated electronic device 104 includes laptop computers, work stations, etc.

Satellite navigation system 106 include multiple satellites that broadcast signals to mobile electronic device. Example Satellite navigation systems include the Global Positioning System (GPS), Galileo System, Global Navigation Satellite System (GLONASS), Compass Navigation System (Compass), etc. In one example, mobile electronic device 102 determines its distance to one or more satellites of satellite navigation system 106. Mobile electronic device 102 then determines its geographical location based on the determined distances between mobile electronic device 102 and the one or more satellites of satellite navigation system 106.

Base stations 108 may be a single cell site or a network of cell sites that communicate with mobile electronic device 102. Base stations 108 may include communication devices (e.g., antennas, transceivers, etc.) for different communication protocols (e.g., WiMax, WiFi, CDMA, etc.). Mobile electronic device 102 may determine its distance to one or more base stations 108 and determine its geographical location based on the determined distances between mobile electronic device 102 and the one or more base stations 108.

Mobile electronic device 102 may communicate with geolocation system 106 and/or base stations 108 to establish the mobile electronic device's geographical location. Mobile electronic device 102 compares the determined geographical location of the mobile electronic device with a stored location of a designated electronic device in a power-off mode. In one example, mobile electronic device 102 may receive the geographical location of designated electronic device 104 via a user input and store the geographical location of designated electronic device 104 as the stored location.

Mobile electronic device 102 sends a wake-up signal to the designated electronic device if the determined geographical location of the mobile electronic device is within a proximity threshold of designated electronic device 104. Designated electronic device 104, upon receipt of the wake-up signal, enters into a power-on mode. The proximity threshold may be preselected or may be user designated. The comparison of the distance between mobile electronic device 102 and designated electronic device 104 may be done periodically, or may be done each time the mobile electronic device's geographical location is updated.

Upon determining that mobile electronic device 102 is within proximity of designated electronic device 104, mobile electronic device 102 may use a communication protocol that is supported by mobile electronic device 102 and designated electronic device 104 to transmit the wake-up signal to designated electronic device 104. Examples of a communication protocol include Bluetooth, WiFi, Near Field Communication (NFC), Ethernet, etc.

Mobile electronic device 102 may repeatedly send the wake-up signal to designated electronic device 104 for a designated period of time to ensure that designated electronic device 104 has received the wake-up signal. The electronic device may designate additional prerequisite conditions for sending the wake-up signal to the designated electronic device. In this case, the wake-up signal is sent to designated electronic device 104 if mobile electronic device 102 is within a proximity of designated electronic device 104 and if prerequisites for sending the wake-up signal are met.

Mobile electronic device 102 may periodically update its geographical location and calculate its proximity to designated electronic device 104 after mobile electronic device 102 has transmitted the wake-up signal to designated electronic device 104. Mobile electronic device may subsequently enter into a reset mode after transmitting the wake-up signal to designated electronic device 104 if the distance between its most recently determined geographical location and the stored location of designated electronic device 104 exceeds the proximity threshold. If Mobile electronic device 102, subsequent to entering reset mode, determines that it is within the proximity threshold of the designated electronic device, it sends another wake-up signal to designated electronic device 104.

Figure 2:
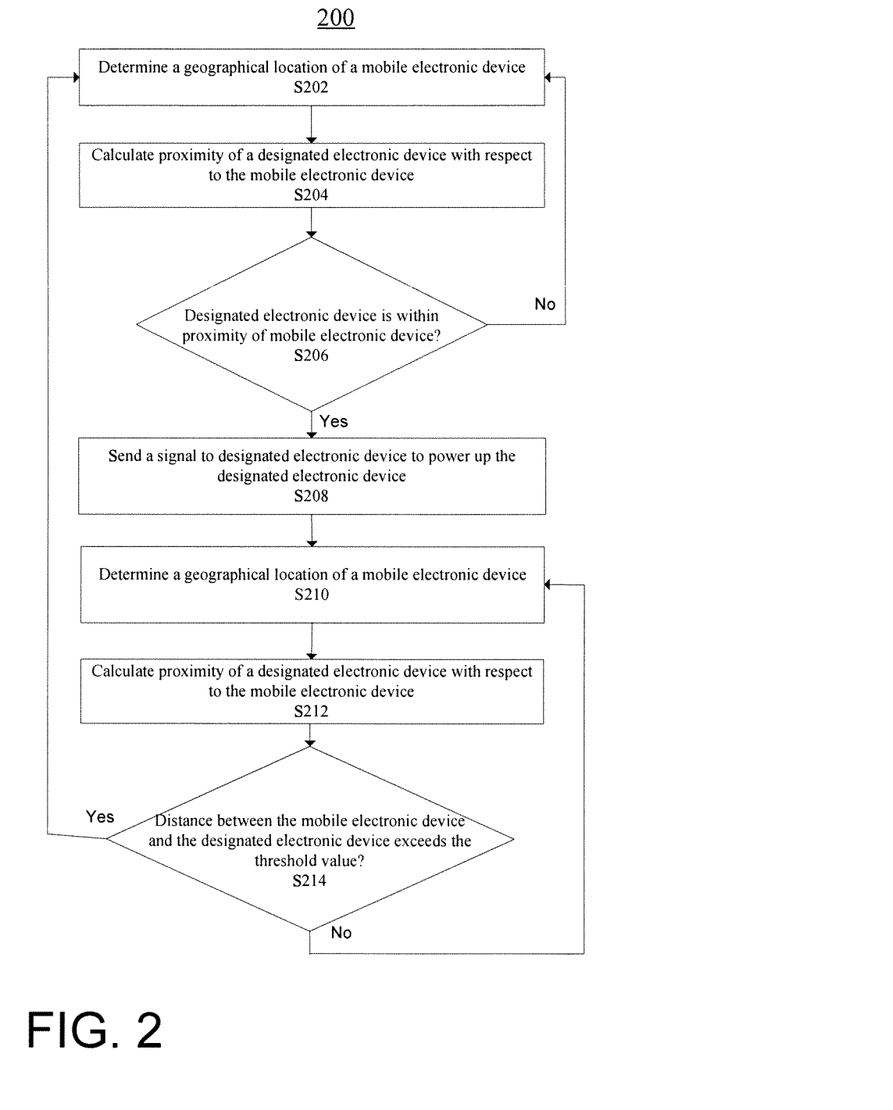
FIG. 2 illustrates an example process for managing a power mode of a designated electronic device.

FIG. 2 illustrates an example process for managing a power mode of a designated electronic device. Although the operations in process 200 are shown in a particular order, certain operations may be performed in different orders or at the same time.

Mobile electronic device (e.g., smartphone device, tablet computer, laptop computer, PDA, etc.) determines its geographical location in block S202. Mobile electronic device 102 also obtains a geographical location of a designated electronic device 104 (e.g., desktop computer, server computer, etc.). In one example, mobile electronic device 102 receives a user input of the geographical location of designated electronic device 104 and stores the received geographical location of designated electronic device 104 as the stored location. In another example, mobile electronic device 102 receives a data packet from designated electronic device 104 that includes the geographical location of designated electronic device 104 during a setup phase and stores the received geographical location of designated electronic device 104 as the stored location.

In block S204, mobile electronic device 102 calculates its distance to designated electronic device 104 (e.g., desktop computer, server computer, etc.). In block S206, if designated electronic device 104 is not within proximity of mobile electronic device 102, the process returns to block S202 where mobile electronic device 102 repeats the process of determining its geographical location. Alternatively, if designated electronic device 104 is within proximity of mobile electronic device 102, the process proceeds to block S208.

In block S208, mobile electronic device 102 sends a signal to designated electronic device 104 to power up the designated electronic device. Mobile electronic device 102 may repeatedly send the wake-up signal to designated electronic device 104 for a designated period of time. The wake-up signal can be transmitted by communication protocols (e.g., Bluetooth, WiFi, etc.) that are supported by both the mobile electronic device and the designated electronic device.

Mobile electronic device 102 may designate one or more additional prerequisite conditions which are required to be fulfilled in order to send the wake-up signal. The one or more additional prerequisite conditions may be predetermined or user designated. One example condition includes specifying a period of time (e.g., certain hours during a day, certain days in a week, certain days in a month, certain hours during certain days, etc.) during which sending the wake-up signal to the designated electronic device is permitted. Under such condition, mobile electronic device 102 would only send a wake-up signal to designated electronic device 104 during the designated hours and when both electronic devices are within proximity of each other.

Mobile electronic device 102 determines geographical location of mobile electronic device 102 in block S210. In block S212, mobile electronic device 102 calculates its proximity to designated electronic device 104. In block S214, mobile electronic device 102 determines if it is not within proximity of designated electronic device 104. If the distance between mobile electronic device 102 and designated electronic device 104 remains within the threshold value, the process returns to block S210 where the process described in blocks S210, S212, and S214 is repeated. A timing delay may be in included to prevent mobile electronic device 102 from constantly cycling through blocks S210, S212 and S214. Alternatively, if the distance between mobile electronic device 102 and designated electronic device 104 exceeds the threshold value, then mobile electronic device 102 enters into a reset mode and the process returns to block S202.

Figure 3:
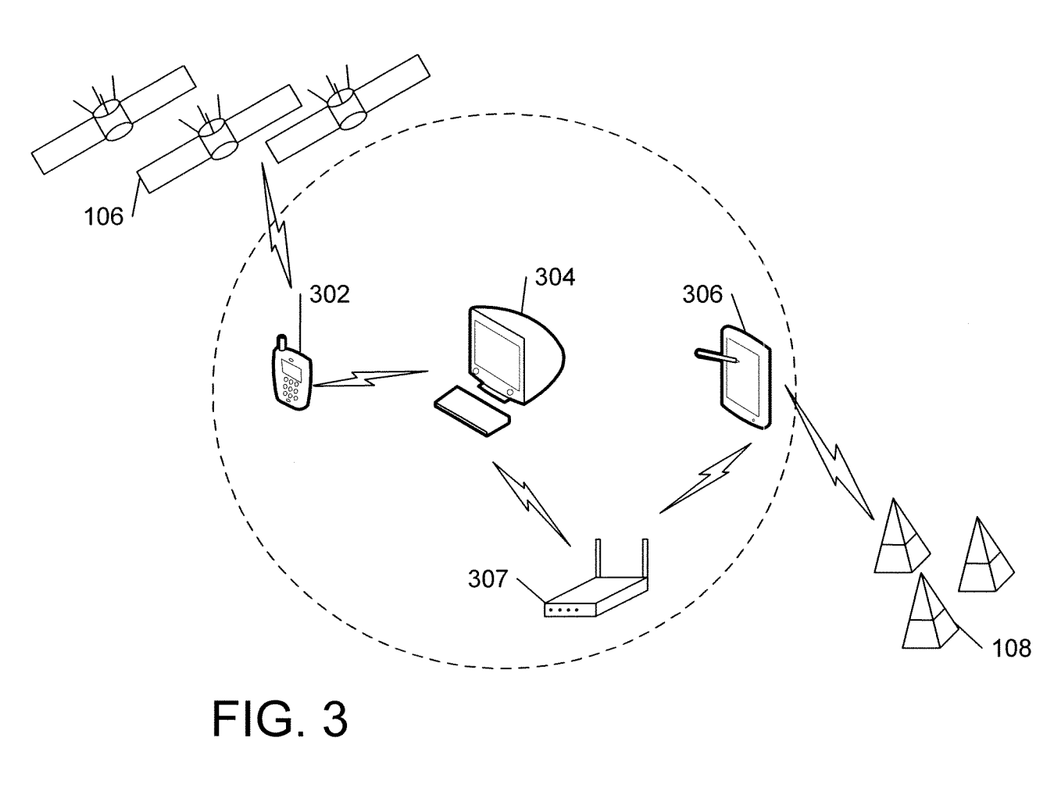
FIG. 3 provides an example illustration for sending a wake-up signal from a mobile electronic device to a designated electronic device when the mobile electronic device is within a proximity threshold of the designated electronic device.

FIG. 3 provides an example illustration for sending a wake-up signal from a mobile electronic device to a designated electronic device when the mobile electronic device is within a proximity threshold of the designated electronic device. The dotted circle as shown in FIG. 3 represents a threshold proximity of designated electronic device 304. Mobile electronic devices are represented as a smartphone device 302, and a tablet computer 306. A designated electronic device is represented as a desktop computer 304. Smartphone device 302 and tablet computer 306 both contain the geographical location of desktop computer 304. In one example, desktop computer provides smartphone 302 with the desktop computer's geographical location when the respective electronic devices 302 and 304 were set up to recognize each other. In another example, tablet computer 306 stores a user-designated location of desktop computer 304.

Smartphone device 302 and tablet computer 306 both include hardware and software that provides the respective mobile electronic devices with their geographical location. As shown in FIG. 3, smartphone device 302 obtains its geographical location based on signals transmitted from satellite navigation system 106. As shown in FIG. 3, tablet computer 306 obtains its geographical location from signals transmitted from base stations 108. Smartphone device 302 and tablet computer 306 periodically calculates distance between their respective geographical locations and the location of desktop computer 304 to determine their respective proximity with respect to desktop computer 304.

Smartphone device 302, upon entering a proximity of desktop computer 304, transmits a wake-up signal to desktop computer 304 directly (e.g., via Bluetooth). Similarly, tablet computer 306, upon entering proximity of desktop computer 304, transmits a wake-up signal to desktop computer 304 via a networking device 307 (e.g., a router). Desktop computer 304 includes a hardware component (e.g., a network card) that can receive the wake-up signal even when the device is in an off-power mode. Upon receipt of the wake-up signal, the hardware component initiates a powering up desktop computer 304.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
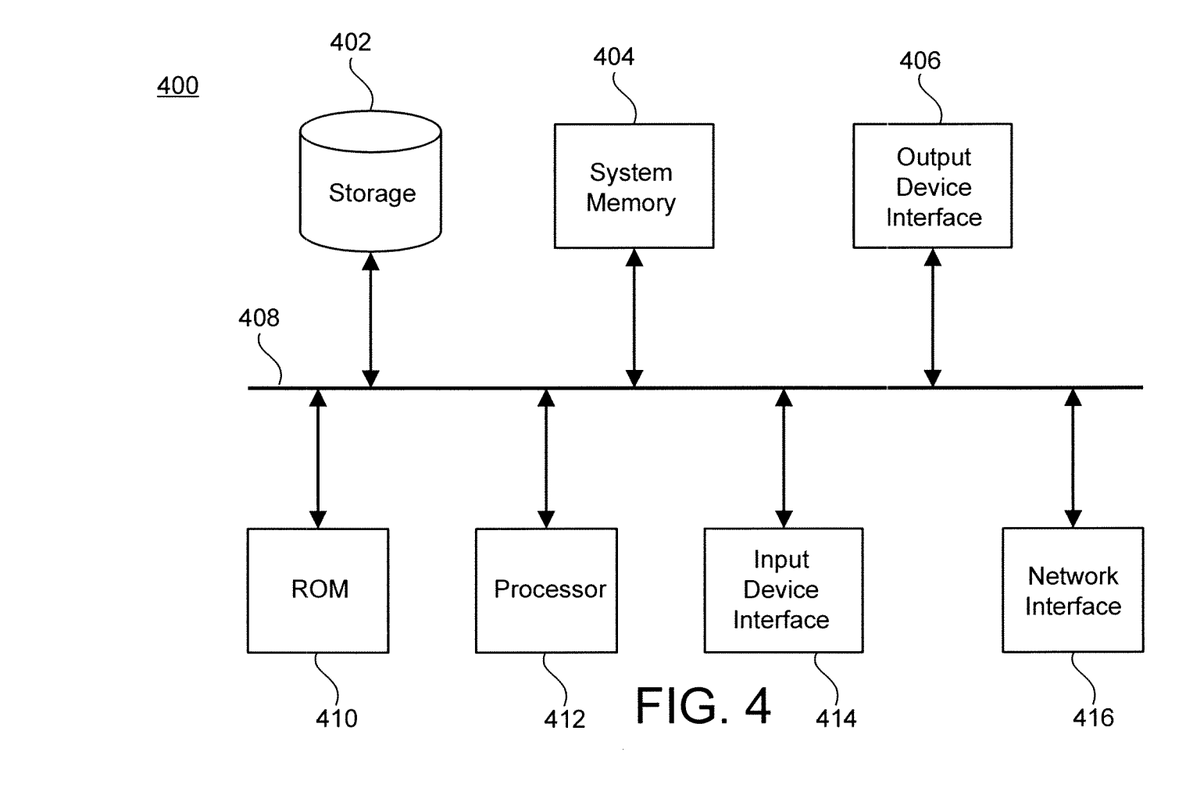
FIG. 4 conceptually illustrates an electronic system with which some implementations of the subject technology are implemented.

FIG. 4 conceptually illustrates an electronic system with which some implementations of the subject technology are implemented. In certain aspects, the computer system 400 may be implemented using hardware or a combination of software and hardware, either in an electronic device 102, 104, or integrated into another entity, or distributed across multiple entities.

Computer system 400 (e.g., electronic device 102 or 104) includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 416 include display devices, such as a CRT (cathode ray tube) or LCD (liquid crystal display) monitor, for displaying information to the user.

According to one aspect of the present disclosure, electronic device 102 or 104 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a computer device having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include electronic devices 102, and 104, and access points. Electronic device 102 or 104 and access point are generally remote from each other. The relationship of the electronic device 102 or 104 and access point arises by virtue of computer programs running on the respective computers and having an electronic device-electronic device or electronic device-access point relationship to each other. Computer system 400 can be, for example, and without limitation, a touchscreen device, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed:

1. A computer-implemented method for managing a power mode of a designated electronic device, the method comprising:

determining a geographical location of a mobile electronic device;

comparing the determined geographical location of the mobile electronic device with a stored location of a designated electronic device in a power-off mode;

repeatedly sending a wake-up signal to the designated electronic device, for a designated period of time, if the determined geographical location of the mobile electronic device is within a proximity threshold of the designated electronic device, wherein the designated electronic device is configured to enter a power-on mode upon receipt of the wake-up signal;

periodically updating the geographical location of the mobile device; and resetting the mobile electronic device if a distance between the updated geographical location of the mobile device and the stored location of the designated electronic device exceeds the proximity threshold, wherein another wake-up signal is sent to the reset mobile electronic device if subsequent to entering the reset mode, the reset mobile electronic device is determined to be within a proximity threshold of the designated electronic device.

2. The computer-implemented method of claim 1, further comprising:

receiving a user designated geographical location of the designated electronic device; and storing the received user designated geographical location of the designated electronic device as the stored location.

3. The computer-implemented method of claim 1, wherein the wake-up signal is transmitted from a Bluetooth component of the mobile electronic device.

4. The computer-implemented method of claim 1, further comprising:

setting one or more additional conditions for sending the wake-up signal to the designated electronic device, wherein the wake-up signal is sent to the designated electronic device if the determined geographical location of the mobile electronic device is within a proximity threshold of the designated electronic device and each of the one or more additional conditions for sending the wake-up signal is met.

5. The computer-implemented method of claim 4, wherein one of the one or more additional conditions for sending the wake-up signal specifies a period of time during which sending the wake-up signal to the designated electronic device is permitted.

6. The computer-implemented method of claim 1, wherein the designated electronic device is a computer.

7. The computer-implemented method of claim 1, wherein the geographical location of the mobile electronic device is obtained from signals transmitted from a satellite navigation system component of the mobile electronic device.

8. The computer-implemented method of claim 1, wherein the geographical location of the mobile electronic device is obtained from signals transmitted from a WiFi component of the mobile electronic device.

9. The computer-implemented method of claim 1, wherein the reset mode corresponds to the resetting of the mobile electronic device, and comprises powering off the mobile electronic device followed by powering on the mobile electronic device.

10. A system for managing a power mode of a designated electronic device, the system comprising: one or more processors; and
a non-transitory machine-readable medium comprising instructions stored therein, which when executed by a processors, cause the processors to perform operations comprising:
determining a geographical location of a mobile electronic device, wherein the geographical location of the mobile electronic device is obtained from signals transmitted from a satellite navigation system component of the mobile electronic device; comparing the determined geographical location of the mobile electronic device with a stored location of a designated electronic device in a power-off mode; and
repeatedly sending a wake-up signal to the designated electronic device, for a designated period of time, if the determined geographical location of the mobile electronic device is within a proximity threshold of the designated electronic device, wherein the designated electronic device is configured to enter a power-on mode upon receipt of the wake-up signal;
periodically updating the geographical location of the mobile device; and
resetting the mobile electronic device if a distance between the updated geographical location of the mobile device and the stored location of the designated electronic device exceeds the proximity threshold, wherein another wake-up signal is sent to the reset mobile electronic device if subsequent to entering the reset mode, the reset mobile electronic device is determined to be within a proximity threshold of the designated electronic device.

11. The system of claim 10, wherein the non-transitory machine-readable medium further comprises instructions stored therein, which when executed by the processors, cause the processors to perform operations comprising:
determining a geographical location of the designated electronic device; and
storing the determined geographical location of the designated electronic device as the stored location, wherein the determined geographical location of the designated electronic device is stored locally on the mobile electronic device.

12. The system of claim 10, wherein the geographical location of the mobile electronic device is obtained from signals transmitted from a WiFi component of the mobile electronic device.

13. The system of claim 10, wherein the non-transitory machine-readable medium further comprises instructions stored therein, which when executed by the processors, cause the processors to perform operations comprising:

receiving a user designated geographical location of the designated electronic device; and
storing the received user designated geographical location of the designated electronic device as the stored location.

14. The system of claim 10, wherein the non-transitory machine-readable medium further comprises instructions stored therein, which when executed by the processors, cause the processors to perform operations comprising:
setting one or more additional conditions for sending the wake-up signal to the designated electronic device,
wherein the wake-up signal is sent to the designated electronic device if the determined geographical location of the mobile electronic device is within a proximity threshold of the designated electronic device and each of the one or more additional conditions for sending the wake-up signal is met.

15. The system of claim 14, wherein one of the one or more additional conditions for sending the wake-up signal specifies a period of time during which sending the wake-up signal to the designated electronic device is permitted.

16. A non-transitory machine-readable medium comprising instructions stored therein, which when executed by a system, cause the system to perform operations comprising:
determining a geographical location of a smartphone device, wherein the geographical location of the smartphone electronic device is obtained from signals transmitted from a satellite navigation system component of the smartphone device;
comparing the determined geographical location of the smartphone device with a stored location of a computer in a power-off mode; and
repeatedly sending a wake-up signal to the computer, for a designated period of time, if the determined geographical location of the smartphone device is within a proximity threshold of the computer, wherein the computer is configured to enter a power-on mode upon receipt of the wake-up signal;
periodically updating the geographical location of the mobile device; and
resetting the mobile electronic device if a distance between the updated geographical location of the mobile device and the stored location of the designated electronic device exceeds the proximity threshold, wherein another wake-up signal is sent to the reset mobile electronic device if subsequent to entering the reset mode, the reset mobile electronic device is determined to be within a proximity threshold of the designated electronic device.

17. The non-transitory machine-readable medium of 16, further comprising instructions stored therein, which when executed by a system, cause the system to perform operations comprising:
setting one or more additional conditions for sending the wake-up signal to the designated electronic device,
wherein the wake-up signal is sent to the designated electronic device if the determined geographical location of the mobile electronic device is within a proximity threshold of the designated electronic device and each of the one or more additional conditions for sending the wake-up signal is met.

18. The non-transitory machine-readable medium of 17, wherein one of the one or more additional conditions for sending the wake-up signal specifies a period of time during which sending the wake-up signal to the designated electronic device is permitted.

* * * * *